Sept. 24, 1963　　　M. GUIOT　　　3,104,544
DEVICES FOR MEASURING TORQUES
Filed Feb. 25, 1960　　　6 Sheets-Sheet 1

INVENTOR
MAURICE GUIOT
By
Wenderoth, Lind & Ponack
Attys.

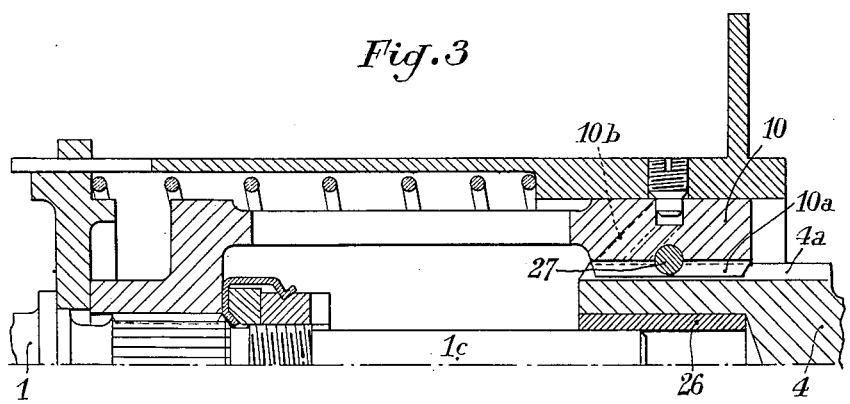
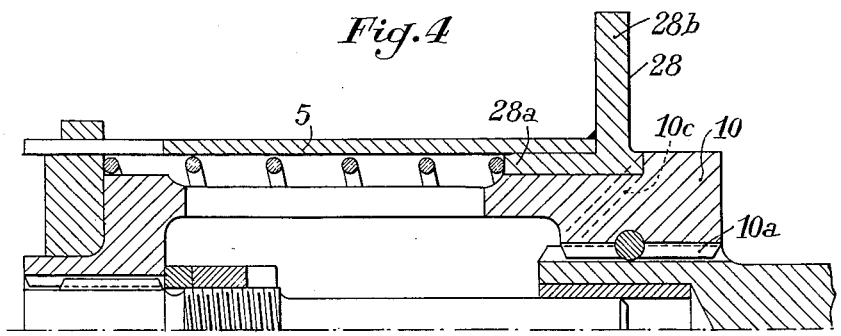
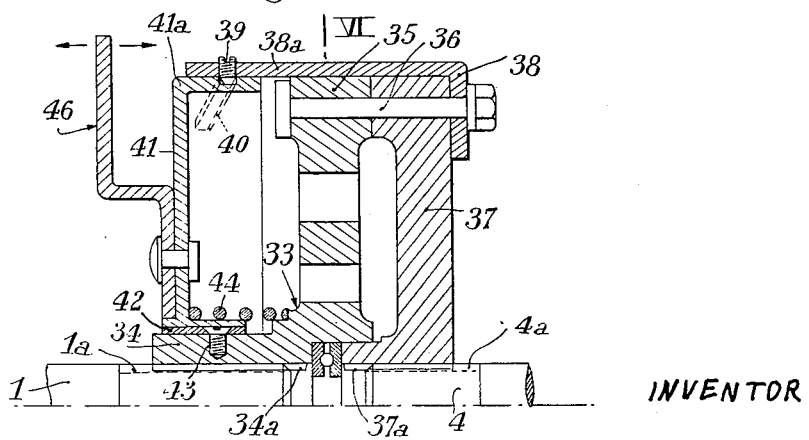

Sept. 24, 1963 M. GUIOT 3,104,544
DEVICES FOR MEASURING TORQUES
Filed Feb. 25, 1960 6 Sheets-Sheet 3

INVENTOR
MAURICE GUIOT
BY
Wenderoth, Lind & Ponack
Att'ys.

Sept. 24, 1963 M. GUIOT 3,104,544
DEVICES FOR MEASURING TORQUES
Filed Feb. 25, 1960 6 Sheets-Sheet 4

INVENTOR
MAURICE GUIOT
By
Wenderoth, Lind & Ponack
Attys.

Sept. 24, 1963    M. GUIOT    3,104,544
DEVICES FOR MEASURING TORQUES
Filed Feb. 25, 1960    6 Sheets-Sheet 5
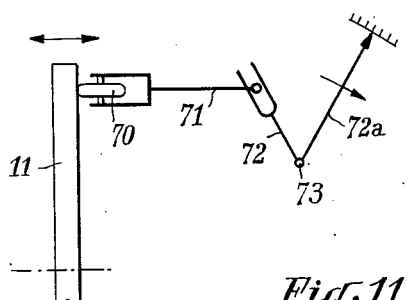
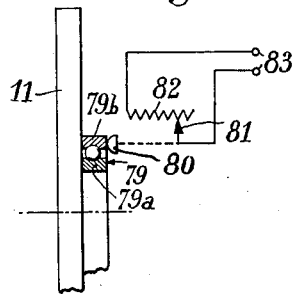
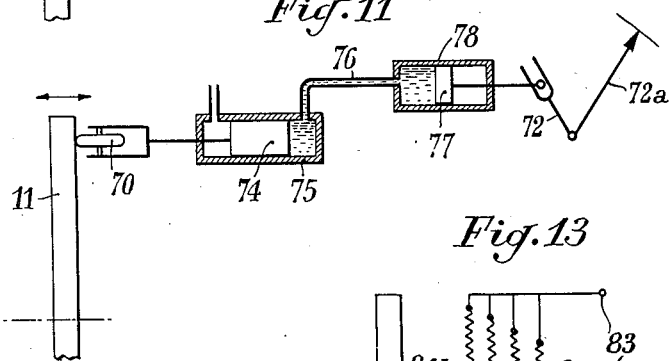
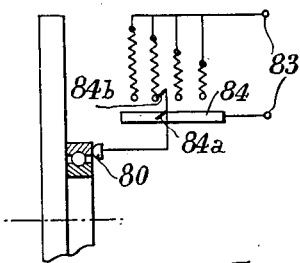
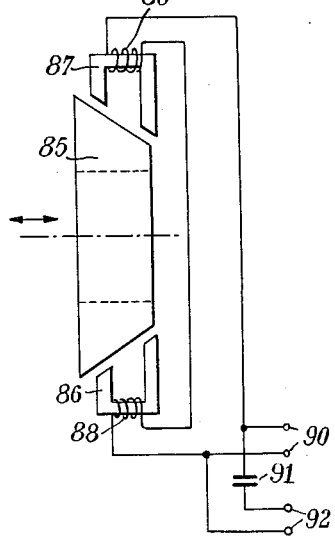
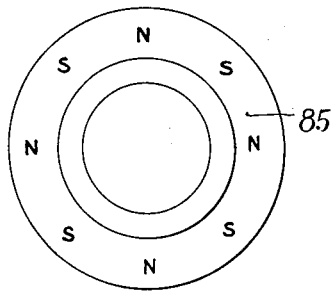
INVENTOR
MAURICE GUIOT
BY
Wenderoth, Lind & Ponack
Attys.

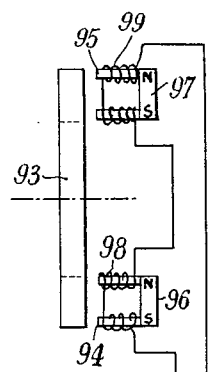
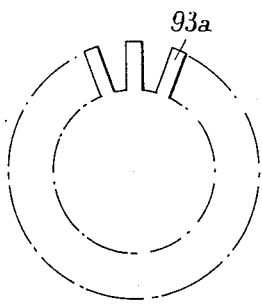
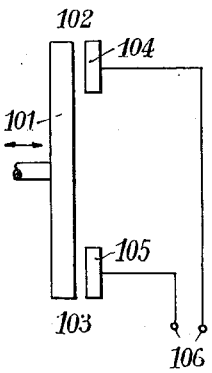
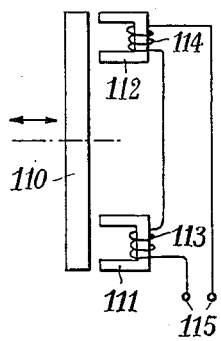
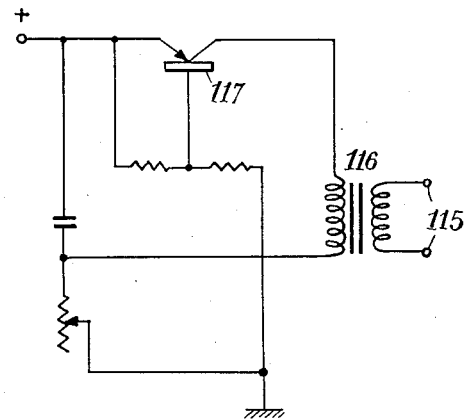
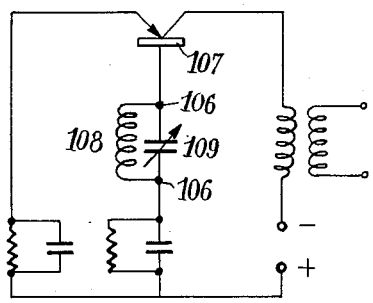

United States Patent Office 3,104,544
Patented Sept. 24, 1963

3,104,544
DEVICES FOR MEASURING TORQUES
Maurice Guiot, Paris, France, assignor to R.E.T.E.M.
Recherches et Etudes Electroniques et Mecaniques,
Fontvieille, Monaco, a societe anonyme
Filed Feb. 25, 1960, Ser. No. 11,040
Claims priority, application France Feb. 26, 1959
3 Claims. (Cl. 73—136)

This invention relates to devices for measuring positive and negative torques, particularly to control machinery.

In known devices, used to measure the torque transmitted between a driving rotating shaft and a driven rotating shaft, the connection between both rotating shafts is secured with a deformable element. This deformable element is made, for example, either with one or several blades operating under flexure stress, or a torsion bar, or a spiral spring whose deformation varies as does the transmitted torque.

The driven shaft carries a detector recording the deformation of the connection element and transmits the checking of this deformation to a measuring torque device and/or to the machine controller, or to a mechanism operating the driving shaft. So torque measurement is related in known devices, to the relative angular displacement measurement of both driving and driven shafts, i.e. of both parts of the deformable element, both of which are interdependent respectively.

Torque measurement devices of the above type have the disadvantage of being difficult to be carried out, as the detector revolves together with the shafts. It results that it is necessary, for example, to provide for common devices an electrical connecting set together with rings in order to be able to transmit the rotating detector's checkings to a stationary apparatus.

In order to eliminate rings and revolving connections one could devise an electric feed current through inductive coupling (revolving transformer) or through an alternator made up with ferrite poles. This feed current is used by a transistor oscillator rigid with the revolving shaft. The torque as recorded through the measuring element alters oscillator outlet current features, either through frequency modulation or through amplitude modulation. Outlet current is secured either by inductive coupling or any other device, and modulation devices are stationary stands. Frequency modulation ratio and amplitude depending on the transmitted torque, in order to operate the measuring or regulating elements, deliver a direct current either proportional to, or a known function of, this torque. These devices or apparatus sets are difficult to operate and not likely to be used for their purpose, that is, to control machinery.

The object of the present invention is to simplify detection and torque measurement devices by making a fixed detector.

The deformable element enables absorbing positive or negative torques with no relative or injurious lash. In order to comply with these directions, a compact element not subject to variations owing to different assemblies will be preferable.

The object of the present invention is a device for measuring the transmitted torque between a driving shaft and a driven shaft by means of a deformable element consisting in transforming the angular displacement of both shafts, which is a function of the transmitted torque, into a longitudinal displacement of a measuring element, and in detecting the longitudinal displacement value of this measuring element by withdrawing all static effects originated from shaft revolutions (warping).

The object of this invention is also a device for measuring the torque transmitted between a driving shaft and a driven shaft, the connection between both of them being carried out through a deformable element so that the transmitted torque causes an angular displacement between both shafts, characterized by the fact that it comprises a measuring element coaxial to both shafts and able to slide longitudinally, a first portion of this measuring element being axially guided with no lash into a first element rigid with one of the shafts, or first shaft, and a second portion of the measuring element being connected to a second element rigid with the second shaft through an assembly transforming the angular displacement between both shafts into a longitudinal displacement of the measuring element. The measuring device includes, in addition, means for detecting the longitudinal displacement of the measuring element and therefore the value of the torque.

The measuring element may be constructed in the form of a cylindrical sleeve having at one end lugs sliding into recesses provided in a first part of the deformable element rigid with a first shaft and, at the other end, a finger located in a groove formed on the periphery of the second part of the deformable element rigid with the second shaft.

The shape of the groove may be helical in case it is desired to convert the angular displacement into a proportional longitudinal displacement.

This groove can also have another shape according to the desired transformation rule between the angular displacement and the longitudinal displacement.

The device to detect the longitudinal displacement of the measuring element can be of any known type, either mechanical, hydraulic, electric or electronic.

Various forms of embodiment of the present invention will now be described by way of non-limiting examples, reference being made to the accompanying drawings wherein:

FIGURE 3 shows a half-longitudinal sectional view of a modified form of embodiment.

FIGURE 4 is a half-longitudinal sectional view of a modified form of embodiment.

FIGURE 5 shows a half-longitudinal sectional view of another form of embodiment.

FIGURE 10 is a diagram of a mechanical device detecting the longitudinal displacements of the measuring element.

FIGURE 11 is a diagram of a hydraulic detecting device.

FIGURE 12 is a diagram of an electro-mechanical detecting device.

FIGURE 13 shows a diagram of another electro-mechanical detecting deivce.

FIGURE 14 is a diagram of an electromagnetic detecting device.

FIGURE 15 is an end view of the measuring element used in the device illustrated in FIG. 14.

FIGURE 16 is a diagram of another embodiment of the electromagnetic detecting device.

FIGURE 17 is an end view of the measuring element used in the device illustrated in FIG. 16.

FIGURE 18 is a diagram of another embodiment of the detecting device.

FIGURE 19 is an electric diagram of an oscillator which can be used in combination with the detecting device illustrated in FIG. 18.

FIGURE 20 is a diagram of another embodiment of the detecting device.

FIGURE 21 is an electric diagram of an oscillator which can be used in combination with the detecting device of FIG. 20.

Figure 1:
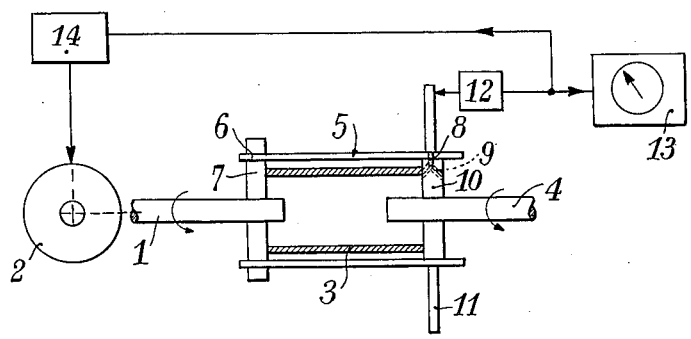
FIGURE 1 shows a diagram illustrating the process according to the invention.

In FIGURE 1, the driving shaft 1 is rotatably driven by a driving element 2. This driving shaft 1 drives in turn, through the medium of a deformable connecting element 3, a driven shaft 4. In operation, the driven shaft 4 is angularly displaced in relation to the driving shaft 1 as a result of the deformation of element 3, this displacement corresponding to the torque transmitted through shaft 1 to shaft 4.

According to the invention, a measuring element 5, coaxial to both shafts 1 and 4, is provided for transforming the angular displacement between shafts 1 and 4 into a longitudinal displacement. The measuring element 5 is guided at one of its ends 6, into a first element 7 rigid with the driving shaft. As a result, this measuring element 5 can slide longitudinally in relation to the deformable element 3.

The other end of the measuring element 5 carries a finger 8 located in a groove 9 provided in a second element 10 rigid with the shaft 4.

The measuring element is fixed to a plate 11 moving in front of the detector 12. This detector 12 registers the variations in the longitudinal position of the plate 11, that is, of the measuring element 5, and transmits the value of the displacement to an indicator device 13.

Thus, for each value of the transmitted torque between the shaft 1 and the shaft 4, there corresponds an angular displacement as determined between both shafts, and a longitudinal displacement of the measuring element 5 due to the guiding of finger 8 in the groove 9. The value of this displacement is transmitted to the indicator device 13 through the detector 12 and one can read directly on the indicator device the value of the transmitted torque.

Should the apparatus be arranged to operate as a controller of the transmitted torque, the indication of the detector 12 is also transmitted to a control device 14 which acts on power element 2, for instance either to maintain the torque within two predetermined limits, or to get the control which, in order to reach this purpose, changes the reducing gear ratio between the power element 2 and the driving shaft 1.

Due to the arrangement of the invention, the detector 12 is stationary.

Figure 2:
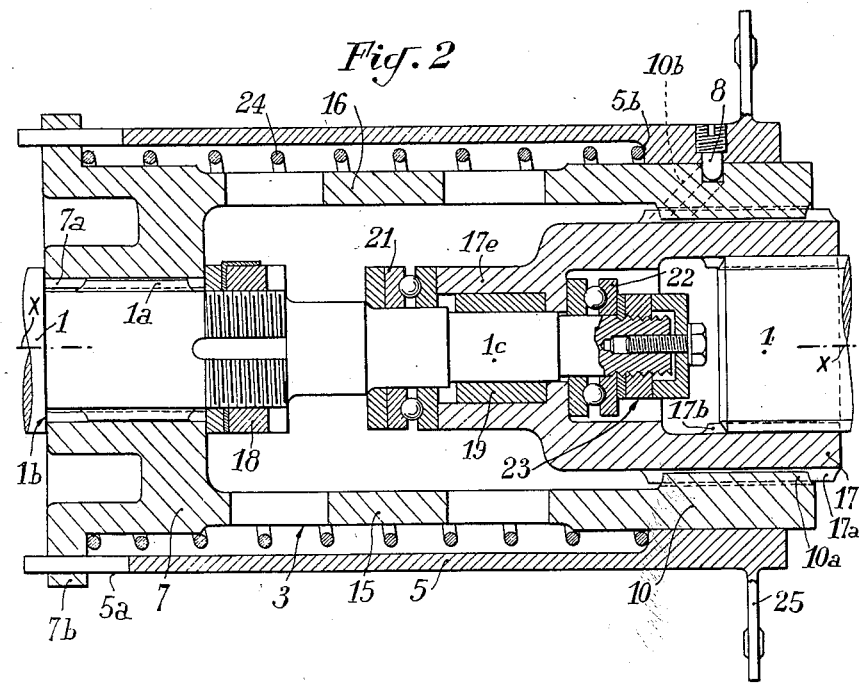
FIGURE 2 shows a longitudinal sectional view of a torque measuring device according to the invention.

In FIGURE 2 is shown the first practical form of embodiment of the connection device between the driving shaft 1 and the driven shaft 4 and of the measuring element. Shaft 1 shows splines 1a into which are engaged corresponding splines 7a provided in the flange 7 of the deformable element 3. This deformable element 3 is composed, in the considered example, of the flange 7 and sleeve 10 connected together by means of a certain number of helical or longitudinal elements, such as longitudinal bars or parts of a cylinder 15, 16, regularly spaced about the axis X—X of the device.

So the element 3 will be altered under torsional stress as a function of the transmitted torque, and the bars 15, 16 take a substantially helical shape. The sleeve 10 has internally splines 10a engaging corresponding splines 17a of a socket 17, coaxial with the shaft 4. This socket 17 has splines 17b engaging corresponding splines of the driven shaft 4.

Flange 7 is locked against the shoulder 1b of shaft 1 by means of nut 18. The end 1c of the shaft 1 goes through the ring 19 located in the socket 17. Besides, two thrust bearings 21 and 22 are locked at opposite ends of the part 17e of the socket 17, by means of fastening device 23.

The measuring element 5 comprises a cylindrical sleeve coaxial to shafts 1 and 4, and has at one of its ends lugs 5a engaged with no lash in recesses provided in skirt 7b of flange 7. At its other end, a finger 8 is screwed which protrudes into a groove 10b provided upon the periphery of the sleeve 10. This groove 10b may have a helical shape when the longitudinal displacement of the measuring element 5 must be proportional to the angular displacement between shafts 1 and 4. It can also have any other shape according to the particular transformation rule one wishes to have between the angular displacement and the longitudinal displacement.

A spring 24, bearing at one end on skirt 7b of flange 7, and at its other end on the inside shoulder 5b provided upon sleeve 5, pushes the sleeve 5 to the right in FIGURE 2 so that the finger 8 will be always in contact with the same edge of groove 10b, thus cancelling the errors due to the lash of finger 8 in this groove.

The cylindrical sleeve 5 carries a plate 25 which is intended to co-operate with the detector to give an indication of the longitudinal displacement of sleeve 5.

In FIGURE 3, the measuring element is substantially similar to that of FIGURE 2, but in this modification the shafts 1 and 4 are not subject to axial thrusts, these being absorbed through the assembly of these shafts into the element from which they come. The extension 1c of shaft 1 is located in the ring 26 carried by shaft 4. The socket 17 of the form shown in FIGURE 2 is dispensed with and the splines 10a of sleeve 10 cooperate with splines 4a of shaft 4. A disc key 27 can secure the axial locking of sleeve 10 to shaft 4.

In FIGURE 4, the measuring device is similar to the one shown in FIGURE 3. The only difference consists in that the sleeve 10 has a ramp 10c of helical or any other configuration which engages the front plane or profile face corresponding to 10c, of the measuring element 28. The portion 28a can slide longitudinally on sleeve 10 and the portion 28b cooperates with the detector not shown.

Figure 6:
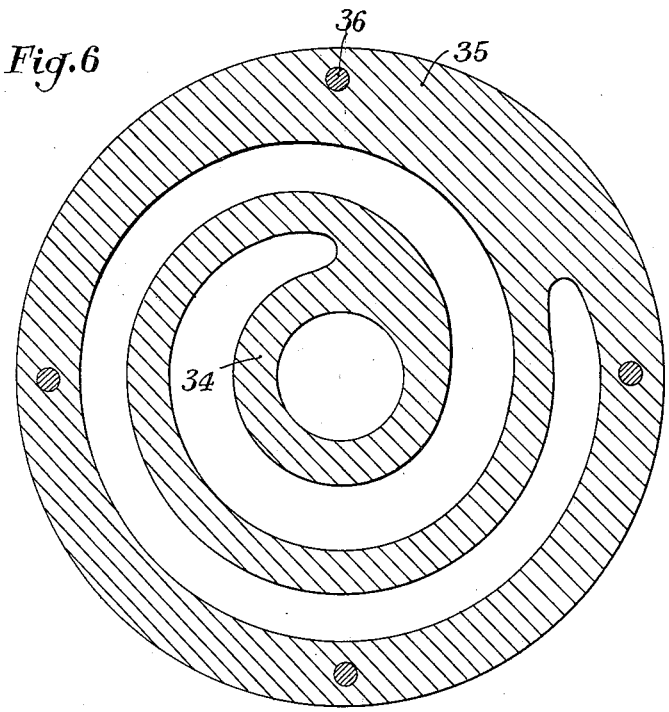
FIGURE 6 is a transverse sectional view taken upon the line VI—VI of FIG. 5.

In FIGURES 5 and 6, the deformable element 33 consists of a part forming a helical spring or flexure radial arms and the hub 34 of which has splines 34a cooperating with splines 1a of the driving shaft 1. The circumferential part 35 is fastened by means of bolts 36 to a flange 37. The flange 37 is formed with splines 37a in meshing engagement with corresponding splines 4a of the driven shaft 4.

The bolt or bolts 36 are also used to fasten part 38 to a leg 38a on which a finger 39 is mounted. The finger 39 protrudes into a groove 40 set in the periphery of skirt 41a of the measuring element 41. This measuring element 41 can slide axially on the hub 34 with which it is interdependent in revolving motion, due for instance to a key 42 fastened on hub 34 by means of screw 43. A spring 44 bearing on a shoulder of hub 34 tends to push back longitudinally the measuring element 41 to the left in FIGURE 5. On this measuring element 41 is secured a plate 46 whose displacements are registered through the detector.

The form of FIGURE 4 could also be adapted, by substituting for finger 39 and groove 40 a helical slope and a measuring element operating at its end.

Thus, in the device according to FIGURES 5 and 6, the angular displacement between shafts 1 and 4 becomes possible through the helical spring 33 which deformation is proportional to the transmitted torque. The angular displacement between shafts 1 and 4 causes a displacement between the measuring element 41 and the part 38 so that the finger 39 working against an edge of the groove 40 transmits to the measuring element 41 a longitudinal displacement as a function of the transmitted torque.

Figure 7:
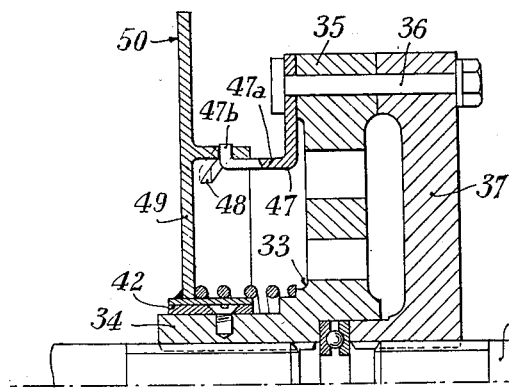
FIGURE 7 is a longitudinal sectional view of another modified embodiment of the measuring device.

The device shown in FIGURE 7 practically includes the same elements as those of the device shown in FIG. 5. The only difference is that the part 47 is rigid with the driven shaft 4 and the deformable element 35 by means of bolts 36 and has a guiding portion 47a whose distance from the axis allows adjusting the sensitivity of the measuring element. The finger 47b consists of a bent portion of the guide element or of an inserted portion. This finger is engaged in the groove 48 provided in the measuring element 49. The latter is shown in the form of a cylindrical sleeve having a flange 50 which co-operates with the detector. As in the device of FIGURE 5, the measuring element 49 can slide on the hub 34 of the deformable element, the measuring element 49 being nevertheless rotatably driven by the hub 34, for example by means of key 42.

Figure 8:
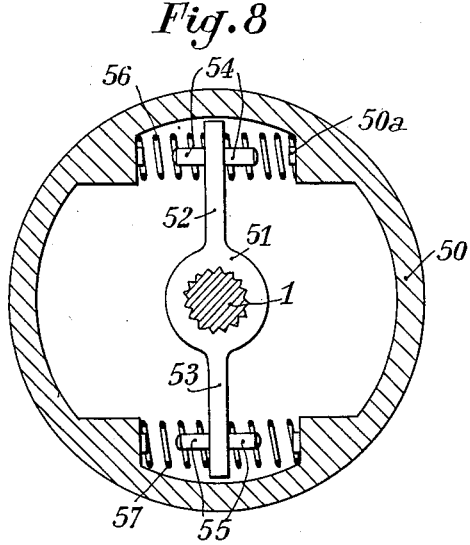
FIGURE 8 is a transverse sectional view of a modified embodiment of the deformable element so to increase the angular displacement between the driving and driven shafts.

Motion transformation forming the subject-matter of the invention is applicable to the form of embodiment illustrated in FIGURE 8 wherein the deformable element which secures the connection between the driving shaft 1 and the cylindrical sleeve 50 rigid with the driven shaft consists of a sleeve 51 fixed to the driving shaft 1, this sleeve being provided with flexible radial blades 52, 53. Each blade, such as 52, 53, carries two fingers 54 and 55 to strike against the shoulders 50a of the cylindrical sleeve 50. Springs 56 and 57 are interposed between blades 52 and 53 and the different shoulders 50a.

Thus, in operation, the transmitted torque existing between the driving shaft and the driven shaft is first absorbed through springs 56, 57 securing a large deformation for low torques and which are compressed or stretched according to the direction of rotation and their positions. When the blades 52, 53 with their fingers 54, 55 do strike against shoulders 50a, they become distorted, being under bending stress in order to absorb subsequent torque increases.

Figure 9:
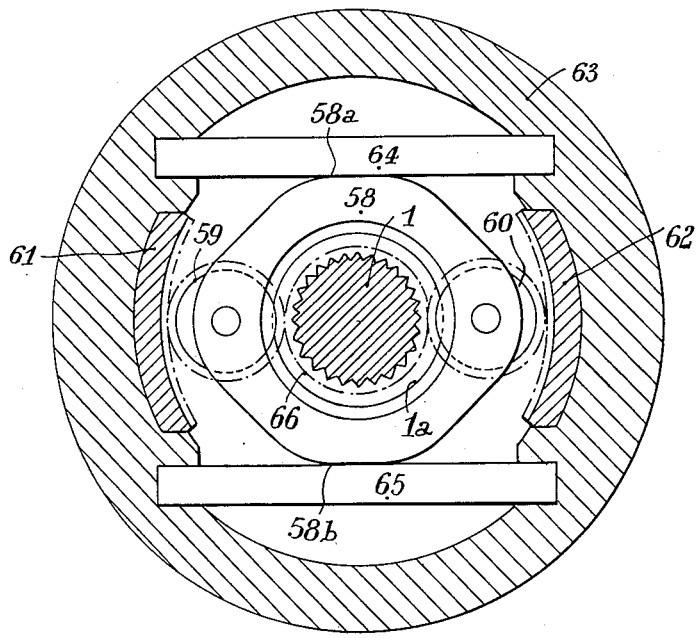
FIGURE 9 is a transverse sectional view of another modified embodiment of the deformable element.

An increase in angular displacement, consequently an adaptability increase for the translation to the detector is shown in FIGURE 9 wherein the driving shaft 1 carries a pinion 66 meshing with two planetary gears 59, 60 set in rotation on a planetary carrier 58. These planetary gears 59, 60 are respectively in meshing engagement with gearing or toothed sectors 61, 62 carried by the cylindrical sleeve 63 rigid with the driven shaft. The planetary gear carrier 58 contacts, through its faces 58a, 58b, two transverse blades 64 and 65 carried by the sleeve 63.

Therefore, in operation, the planetary gear carrier 58, due to the transmitted torque between the driving shaft 1 and the sleeve 63, tends to turn in relation to the latter, so that the faces 58a, 58b of this planetary gear carrier exert on blades 64, 65 some thrusts towards the outside.

These blades are flexible and then are deformed to absorb the transmitted torque, and therefore for each torque value an angular displacement is determined between the shaft 1 and the sleeve 63.

Various forms of embodiment of the detector devices will now be described.

In FIGURE 10, a roller 70 runs on the plate 11 of the measuring element. This roller 70 is carried by a rod 71 which acts upon a lever arm 72 pivoted about an axis 73. Therefore, a longitudinal displacement of the plate 11 causes a corresponding revolution of the lever 72 and the arm 72a of which gives then a direct indication of the transmitted torque measurement.

In the modified embodiment illustrated in FIGURE 11, the roller 70 controls the displacement of the piston 74 movable in a cylinder 75. The displacement of piston 74 is transmitted through the medium of a pipe line 76 filled with liquid to a piston 77 movable in a cylinder 78. The piston 77 operates, as previously, on an arm of lever 72 whose arm 72a shows the value of the transmitted torque.

In FIGURE 12, the plate 11 is rigid with a cage 79a of a ball bearing 79. The fixed bearing cage 79b contacts a follower 80 rigid with the slider 81 of a rheostat 82. By connecting any electrical measuring device to the terminals 83 connected to the rheostat 82, it is possible to detect the transmitted torque through resistance variation between the terminals 83.

In FIGURE 13, a similar setting is illustrated, but the rheostat is replaced with a step switch 84. The follower 80 controls the simultaneous displacement of two friction members 84a, 84b facing respectively mutual and different contact studs.

These contact studs are connected by resistances of different values to one of the terminals 83, the other terminal being connected to a common terminal of the switch. This device shows the torque variations by means of a discontinuous indication.

In FIGURES 14 and 15, the measuring element illustrated carries a truncated ring 85 made of ferrite, this ring having alternate North-South laminations as indicated in FIGURE 15. The ring 85 passes in front of two U armatures 86 and 87 over which are wound coils 88 and 89 respectively. These coils 88 and 89 are connected in series between terminals 90 on the one hand, and in series with a condenser 91 between the terminals 92 on the other hand.

In this form of embodiment, the alternating energy generated by the ferrite ring 85 in the windings 88 and 89 varies as an inverse function of the air gap existing between this ring and the armatures 86 and 87, i.e. as a function of the axial position of the ring 85. Thus, it is possible to find out at terminals 90 the variations of this energy and therefore the value of the transmitted torque.

It is possible to simultaneously obtain at terminals 92 the frequency measurement of the oscillations generated in the windings 88 and 89, that is, it is possible to detect at terminals 92 the velocity of rotation of the ferrite ring 85.

Therefore, should electric quantities be taken off at terminals 90, indicating respectively the torque C and the velocity of rotation n, it is possible by combining into a proper measuring device supplying a proportional quantity to output $C \times n$, to give a direct indication of the power transmitted.

The power generated through the ferrite ring 85 can be sufficient to allow the direct control, without intermediate amplifier stage, of the torque indicator devices or any other regulator systems.

In FIGURES 16 and 17, the measuring element is rigid with the revolving disc 93, the latter showing teeth 93a on its circumference. These teeth pass in front of two identical magnetic iron armatures 94, 95 closed respectively with ferrite magnets 96, 97. Over the magnetic iron armatures 94, 95 are respectively wound windings 98, 99 connected in series between the terminals 100.

The operation of this device is similar to the one illustrated in FIGURES 14 and 15.

Owing to the reluctance variation due to the passing of the teeth in front of the magnetic iron armatures 94, 95, the revolution of disc 93 causes the production, in the windings 98, 99, of oscillations collected between terminals 100. The collected energy is a function of the air gap existing between the disc 93 and the magnetic iron armatures 94—95. Therefore this energy is a function of the transmitted torque.

In FIGURE 18, the plate 101 forms the common armature of both condensers 102, 103, the other armatures 104, 105 of which are connected respectively to the terminals 106. Thus, an axial displacement of the plate 101 is converted in condensers 102, 103 into a capacity variation.

FIGURE 19 shows an oscillator with transistor 107 in the basis circuit of which a resonance circuit is connected which consists of an inductance 108 and an adjustable condenser 109. The detecting device according to FIGURE 18 can be connected, through its terminals 106, to the ends of the inductance 108 so that the capacity variation resulting from the transmitted torque variation is converted into a frequency variation of the oscillator. Then it is easy to detect this frequency variation through appropriate means in order to compute the transmitted torque measure.

In FIGURE 20 the measuring element is rigid with a disc 110 which passes by opposite two magnetic iron circuits 111, 112 carrying respectively windings 113, 114 connected in series with terminals 115. The axial displacement of disc 110 causes the inductance to vary between the terminals 115.

The device according to FIGURE 20 can be connected to the terminals 115 of FIG. 21, these terminals being connected to the secondary winding of a transformer 116 the primary winding of which is connected to the transistor collector 117 acting as an oscillator.

There again, the inductance variation between the terminals 115 results in a frequency variation of the oscillator; this variation can be detected through appropriate means in order to give an indication of the transmitted torque value.

Of course, many modifications of detail can be brought to the form of embodiment described hereinabove with reference to the accompanying drawings without thereby departing from the spirit and scope of the invention.

What I claim is:

1. Device for simultaneously measuring the velocity of rotation and the transmitted torque between a driving shaft and a driven shaft, comprising connection means between said driving and driven shafts, said connection means being deformable through torsion stress so that the transmitted torque involves an angular displacement between the two shafts, a measuring element coaxial to both shafts and capable of sliding longitudinally, said measuring element being rotatably driven with said driving shaft and driven shaft, means for transforming the angular displacement between both shafts into a longitudinal sliding displacement of said rotatable measuring element, electromagnetic pick-up means producing electric pulses having a frequency proportional to the velocity of rotation of said measuring element and an amplitude proportional to the longitudinal momentary position of said measuring element, and electrical circuit means for measuring on the one hand the frequency of said electric pulses for displaying the velocity of rotation of said driving and driven shafts, and on the other hand the amplitude of said electric pulses, and therefore for indicating the value of the torque transmitted between said driving and driven shafts.

2. Device as set forth in claim 1, wherein the measuring element is a truncated ring-shaped magnet having North-South poles disposed in alternate relationship along its circumference, at least one circuit carrying a winding, said North-South poles of the magnet moving past said circuit so that an alternating current is generated within said winding, the magnitude of said current being proportional to the axial position of the magnet and the frequency of said current being a function of the velocity of rotation of both shafts.

3. Device as set forth in claim 1, wherein said measuring element is a plate made from magnetic material, said plate having teeth on its circumference, at least one circuit, a permanent magnet in said circuit, said teeth of the plate moving past said circuit so that an alternating current is generated within said winding, the magnitude of said current being proportional to the axial position of the plate and the frequency of said current being a function of the velocity of rotation of both shafts.

References Cited in the file of this patent

UNITED STATES PATENTS

| | | |
|---|---|---|
| 1,204,292 | McCormick | Nov. 7, 1916 |
| 2,217,539 | DeBruin | Oct. 8, 1940 |
| 2,468,696 | Westberg | Apr. 26, 1949 |
| 2,550,693 | Hart | May 1, 1951 |
| 2,700,896 | Root | Feb. 1, 1955 |
| 2,913,662 | Hogan | Nov. 17, 1959 |
| 2,947,168 | Yang | Aug. 2, 1960 |

FOREIGN PATENTS

| | | |
|---|---|---|
| 370,044 | Germany | Feb. 26, 1923 |
| 111,428 | Switzerland | Aug. 17, 1925 |
| 554,276 | Germany | July 7, 1932 |
| 879,009 | France | Nov. 2, 1942 |
| 640,238 | Great Britain | July 12, 1950 |